United States Patent [19]

Futamura

[11] 4,118,041

[45] Oct. 3, 1978

[54] SEAL STRUCTURE

[75] Inventor: Kazumasa Futamura, Toyota, Japan

[73] Assignee: Toyota Jidosha Kogyo Kabushiki Kaisha, Toyota, Japan

[21] Appl. No.: 809,020

[22] Filed: Jun. 22, 1977

[30] Foreign Application Priority Data

Mar. 1, 1977 [JP] Japan .................. 52/21777

[51] Int. Cl.$^2$ ............................................. F16J 15/02
[52] U.S. Cl. ................................. 277/180; 277/166; 277/235 B
[58] Field of Search ..................... 277/180, 166, 235 B

[56] References Cited

U.S. PATENT DOCUMENTS 2,790,660   4/1957   Jones ..................................... 277/180

FOREIGN PATENT DOCUMENTS 1,227,402   3/1960   France ..................................... 277/180

Primary Examiner—Robert I. Smith
Attorney, Agent, or Firm—Stevens, Davis, Miller & Mosher

[57] ABSTRACT

A seal structure is disclosed for connection of two structural members having co-operating seal face portions clamped together with interposition of an elastic seal element, wherein stud bolts each having a central flange portion and first and second screw portions provided at opposite sides of the flange portion are screwed into corresponding threaded openings formed in the seal face portion of one structural member while the seal portion of the other structural member is clamped between the flange portions of the bolts and nuts clamped onto the second screw portion of the bolts, the elastic seal element being thicker than the flange portions of the bolts in its free condition and being compressed in the clamped condition to be of the same thickness as the flanged portions of the bolts.

3 Claims, 5 Drawing Figures

SEAL STRUCTURE

BACKGROUND OF THE INVENTION

The present invention relates to a seal structure and, more particularly, a seal structure for first and second structural members which have co-operating seal faces and are clamped together with a seal element being interposed between said co-operating seal faces, such as, for example, a seal structure for the connecting portion of the cylinder block and the oil pan, the connecting portion of the cylinder head and the cylinder head cover or the like in internal combustion engines.

In engines, the oil pan and the cylinder head cover must be mounted to the cylinder block with an oil-tight seal structure incorporated therebetween so as to avoid any leakage of oil at the connecting portion. FIG. 1 shows a typical conventional seal structure employed for the connection of the cylinder block and the oil pan, wherein 1 designates the cylinder block having a seal face 2 formed along the lower peripheral edge thereof while 3 designates the oil pan having a flange portion 4 formed along the upper peripheral portion thereof, said flange portion having a seal face 5 arranged to co-operate with the seal face 2 of the cylinder block. A seal element 6 such as an annular gasket is interposed between the two seal faces 2 and 5 and the oil pan 3 is clamped to the cylinder block 1 by a plurality of clamping bolts 8 each being passed through an opening 7 formed in the flange portion 4 of the oil pan and a corresponding opening formed in the seal element and screwed into a corresponding threaded opening 9 formed in the cylinder block 1. Conventional auxiliary elements such as a plain washer 10 and a spring washer 11 may of course be employed as shown in FIG. 1.

In order that the seal structure such as shown in FIG. 1 ensures a good seal performance for a long period of operation, a lot of conditions must be satisfied: such as that the individual clamping bolts are uniformly clamped by the same clamping torque, the initial clamping condition is stably maintained, the seal element is uniformly compressed over the whole area thereof, the compression applied to the seal element is of a desirable value which ensures the sealing performance of the seal element while it does not detract from the elasticity of the seal element, the clamping structure is immune to vibration, etc..

In usual automobile engines, the cylinder block and the oil pan are connected by 20 to 30 connecting bolts. When this number of clamping bolts are employed in a seal structure such as shown in FIG. 1, the bolt clamping process requires delicate control. For example, a sequential little-by-little tightening of the bolts does not necessarily guarantee a uniform clamping of the whole bolt system. Furthermore, the compression effected in the seal element is not necessarily proportional to the clamping torque applied to a clamping bolt. FIG. 2 shows an example of the relation between the compression effected in the seal element and the clamping torque applied to a clamping bolt. Generally, the compression for the seal element which provides the optimum sealing performance of the seal structure is in a range such as shown by A, wherein the gradient of compression/clamping torque is relatively large. This means that the clamping torque applied to the bolts must be controlled within a very narrow range, while in actual operation the possible control range for the clamping torque is approximately of an order such as shown by B. Therefore, in most cases, a compromise must be effected, so that the clamping condition of the seal structure is not always at the optimum condition over the entire region thereof. If the seal element is compressed beyond a proper compression ratio which preserves elasticity of the seal material, the seal element will soon undergo a permanent deformation, thereby losing seal performance and causing a leakage of oil. Particularly in the case of the real structure incorporated in the connecting portion of the cylinder block and the oil pan of engines, which is subject to cyclic heating and vibration, a seal element compressed in an improper stress condition is very liable to a permanent deformation. If a permanent deformation of the seal element occurs, it causes a loosening of the clamping bolts, which further accelerates the deterioration of the seal structure.

SUMMARY OF THE INVENTION

It is therefore the object of the present invention to provide an improved seal structure for two joining structural members which is easy to manufacture and assemble and low in manufacturing cost and yet ensures a high sealing performance for a long period of operation.

In accordance with the present invention, the above-mentioned object is accomplished by providing a seal structure comprising first and second structural members having co-operating seal face portions, a seal element interposed between said co-operating seal face portion, stud bolts each having a central flange portion and first and second screw portions provided at opposite sides of said flange portion, said seal face portion of said first structural member having threaded openings in which are firmly screwed said first screw portions of said bolts, said seal face portion of said second structural member having through openings through which are passed said second screw portions of said bolts and nuts mounted to said second screw portions of said bolts so as to clamp said face portion of said second structural member between said flange portions of said bolts and said nuts, said seal element being thicker than said flange portion of said bolts in its free condition, and being compressed by said co-operating seal face portions to be of the same thickness as said flange portion.

By this arrangement of the seal structure, the first and second structural members are firmly connected by said stud bolts and nuts, wherein the firm assembly of these elements is accomplished by the firm frictional engagement of said first structural member and the flanged portions of said bolts, on the one hand and the firm frictional engagement of said second structural member and the flanged portions of said bolts and said nuts, on the other hand. This firm assembly of said first and second structural members automatically provides a space of a predetermined thickness dimension for receiving said seal element and automatically ensures that if a seal element having a predetermined thickness in its free condition which is larger than said thickness dimension of said space by a predetermined margin for compression is employed, the seal element is uniformly prestressed at a predetermined compressed condition when said nuts have been firmly clamped onto said second screw portions of said bolts.

BRIEF DESCRIPTION OF THE DRAWING

The present invention will become more fully understood from the detailed description given hereinbelow and the accompanying drawings which are given by way of illustration only and are thus not limitative of the present invention and wherein.

DESCRIPTION OF THE PREFERRED EMBODIMENT

Figure 1:
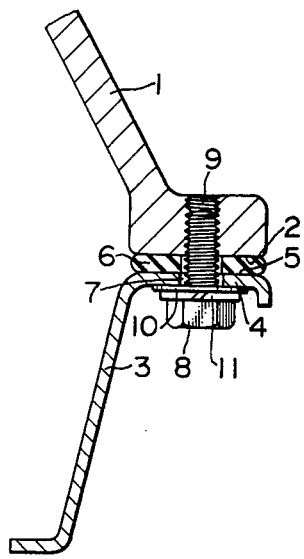
FIG. 1 is a sectional view showing a typical conventional seal structure employed for the connecting portion of the cylinder block and the oil pan of engines.
Figure 2:
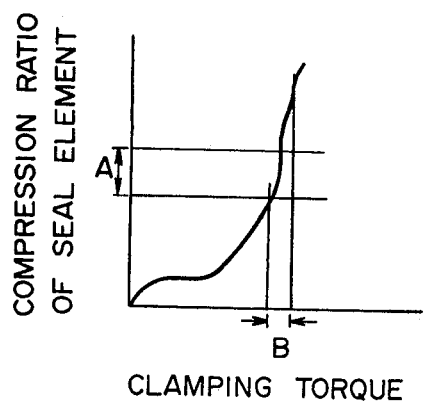
FIG. 2 is a graph showing the relation of the compression ratio of a seal element to the clamping torque for clamping bolts in the conventional seal structure.
Figure 4:
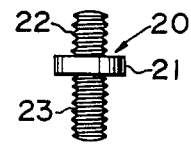
FIG. 4 is a side view of the stud bolt employed in the seal structure shown in FIG. 3.
Figure 3:
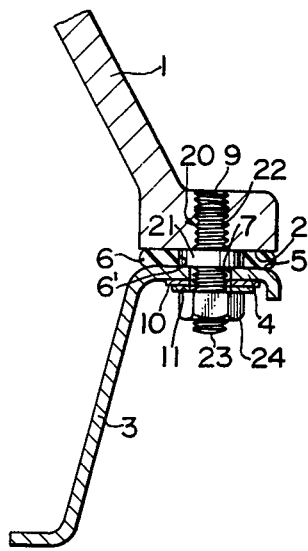
FIG. 3 is a sectional view showing an embodiment of the seal structure of the present invention in a manner similar to FIG. 1 for the convenience of illustration.

Referring to FIG. 3 showing an embodiment of the seal structure of the present invention in a manner similar to FIG. 1 for the convenience of illustration, the portions corresponding to those shown in FIG. 1 are designated by the same reference numerals as in FIG. 1. In this seal structure, a stud bolt 20 and a nut 24 are employed instead of the clamping bolt 8 in the conventional structure. The stud bolt 20 has a flange portion 21 having a predetermined thickness or axial dimension and first and second screw portions 22 and 23 provided at opposite sides of said flange portion. The first screw portion 22 is screwed into the threaded opening 9 formed in the seal face portion of the cylinder block 1 just in the same manner as in the conventional seal structure shown in FIG. 1. In this case, however, the flanged second screw portion 22 is firmly screwed into the threaded opening 9 until it is clamped thereto by frictional engagement of the seal face 2 and the flange portion 21 of the bolt.

The seal face portion 4 of the oil pan 3 is formed with the through opening 7 (actually, a plurality of openings) which has a larger diameter than the second screw portion 23 of the bolt in the same manner as in the conventional structure shown in FIG. 1. However, it will be noted that in the seal structure shown in FIG. 3 the oil pan 3 can be mounted to the shown position after the bolt 20 has been firmly mounted to the cylinder block 1 by passing the second screw portion 23 through the opening 7 of the oil pan. Between the co-operating seal face portions of the cylinder block and the oil pan is mounted the seal element 6 which may be of the same kind as that employed in the conventional seal structure shown in FIG. 1. However, the thickness of the seal element 6 in its free condition for use with the present seal structure needs to be precisely controlled to be larger than the thickness of the flange portion 21 of the bolt 20 by a predetermined amount which generates the most desirable compression stress in the seal element when it has been cancelled by compressing the seal element to the same thickness as the flange portion 21 of the bolt 20. The seal element 6 is formed with a through opening 6' (actually, a plurality of openings) in which the flange portion 21 of the bolt 20 is received.

In assembling the seal structure shown in FIG. 3, the stud bolt 20 is first mounted to the cylinder block 1 by screwing the first screw porion 22 into the threaded opening 9 until the flange portion 21 firmly frictionally engages the seal face 2 of the cylinder block. Next, the seal element 6 is mounted with its through opening 6' being engaged with the flange portion 21 of the bolt 20. Then the oil pan 3 is mounted with its opening 7 being engaged with the second screw portion 23 of the bolt 20. Then the flat washer 10 and the spring washer 11 are mounted onto the second screw portion 23 and finally the nut 24 is screwed onto the second screw portion 23. The nut 24 may be tightened until it stops rotating further by firmly clamping the flange portion 4 of the oil pan and the two washers 10 and 11 between itself and the flange portion 21 of the bolt. Under this condition, the seal element 6 is automatically compressed to be of the same thickness as the flange portion 21. When a plurality of stud bolts 20 are arranged along the annular seal face portions with a proper spacing, the seal element 6 is uniformly compressed over the entire region thereof when each nut 24 has been firmly clamped onto the screw portion 23 until it automatically stops rotating further, i.e., when the seal element 16 has been compressed to the same thickness as flange portion 21.

Figure 5:
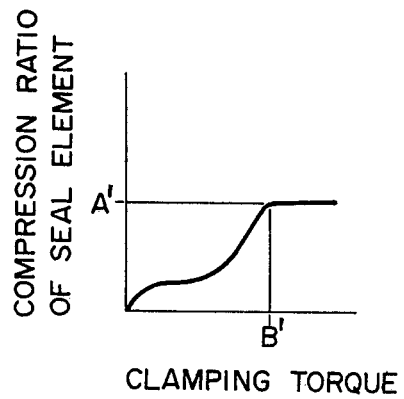
FIG. 5 is a graph showing the relation of the compression ratio of the seal element to the clamping torque applied to the nut in the seal structure of the present invention.

FIG. 5 shows the relation of the compression ratio of the seal element 6 to the clamping torque applied to the nut 24. As shown in the graph, the compression ratio of the seal element reaches the maximum value A' when the clamping torque has reached a value B' which causes tight contact of the flange portion 21 of the bolt, flange portion 4 of the oil pan, plain washer 10, spring wahser 11, and nut 24. The compression ratio does not increase beyond the maximum value A' even when the clamping torque is increased beyond the value B'. Thus, it is ensured that the seal element 6 is always automatically compressed to a predetermined compression ratio when the nut 24 has been clamped by a clamping torque exceeding a certain value.

From the foregoing, it will be appreciated that the seal structure of the present invention provides a firm assembly of the two structural members connected via a seal structure incorporating an elastic element such as the seal element by firm frictional engagement of rigid connecting means such as the seal face portions of the two structural members, bolts and nuts and yet it definitely ensures that the elastic seal element is uniformly compressed at a predetermined compression ratio so as to guarantee a high sealing performance for a long period of operation under severe operating conditions such as cyclic heating and cooling and vibration.

Although the invention has been shown and described with respect to a preferred embodiment thereof, it should be understood by those skilled in the art that various changes and omissions of the form and detail thereof may be made therein without departing from the scope of the invention.

I claim:

1. A seal structure comprising first and second structural members having co-operating seal face portions, a seal element interposed between said co-operating seal face portions, stud bolts each having a central flange portion and first and second screw portions provided at opposite sides of said flange portion, said seal face portion of said first structural member having threaded openings in which are firmly screwed said first screw portions of said bolts, so that said bolts are firmly maintained in the screwed-in position by tight frictional engagement between said seal face portion of said first structural member and said flange portions of said bolts, said seal face portion of said second structural member having through openings through which are passed said second screw portions of said bolts, and nuts mounted to said second screw portions of said bolts so as to clamp said face portion of said second structural member between said flanged portions of said bolts and said nuts, said seal element having through openings in which said flange portions of said bolts are positioned and being thicker than said flange portions of said bolts in its free condition and being compressed by said cooperating seal face portions to be of the same thickness as said flange portions.

2. The seal structure of claim 1, further comprising washers each being mounted between said face portion of said second structural member and said nut.

3. The seal structure of claim 1, wherein said first and second structural members are a cylinder block and an oil pan of internal combustion engines.

* * * * *